United States Patent [19]

Von Sloun

[11] Patent Number: 4,803,924
[45] Date of Patent: Feb. 14, 1989

[54] MANUAL ACTIVATOR FOR RESERVE BATTERIES

[75] Inventor: Peter H. Von Sloun, Hopkins, Minn.
[73] Assignee: Honeywell Inc., Minneapolis, Minn.
[21] Appl. No.: 155,910
[22] Filed: Feb. 16, 1988
[51] Int. Cl.$^4$ .......................... F42C 15/00; F42C 15/40
[52] U.S. Cl. ...................................... 102/293; 102/207; 102/221
[58] Field of Search ............... 102/207, 221, 293, 401, 102/427, 482, 486, 499

[56] References Cited

U.S. PATENT DOCUMENTS

| | | | |
|---|---|---|---|
| 2,403,567 | 7/1946 | Wales, Jr. | 102/207 |
| 2,682,567 | 6/1954 | Porter | 102/207 |
| 2,900,908 | 8/1959 | Burrell | 102/207 |
| 2,931,848 | 4/1960 | Burrell | 102/207 |
| 3,679,487 | 7/1972 | Coyle | 102/207 |

*Primary Examiner*—Charles T. Jordan
*Attorney, Agent, or Firm*—R. W. Jensen; E. W. Hughes

[57] ABSTRACT

A manual activation device (10) includes a support element (40) and a lever (42) having a cam surface (80) which contacts a ball (38) carried in a cap (36) mounted at one end of a reserve battery (17). Activation of the battery (17) is accomplished by rotating the lever (42) about a pivot pin (59) in the support element (40), causing the cam surface (80) to drive the ball (38) into the battery (17) and break the ampule (24) within the battery (17). The lever (42) is preferably mounted on the pivot pin (59) by means of a slotted bearing surface (82) which enables the lever (42) to be removed from the support element (40) only after the ampule (24) has been broken. In addition, when the device is used in a Pursuit Deterrent Munition (PDM) (12), the lever (42) may be connected to the safety pin (18) and the shorting bar (20) of the munition (12), causing both of those elements to be withdrawn when the lever (42) is pivoted.

19 Claims, 1 Drawing Sheet

U.S. Patent
Feb. 14, 1989
4,803,924
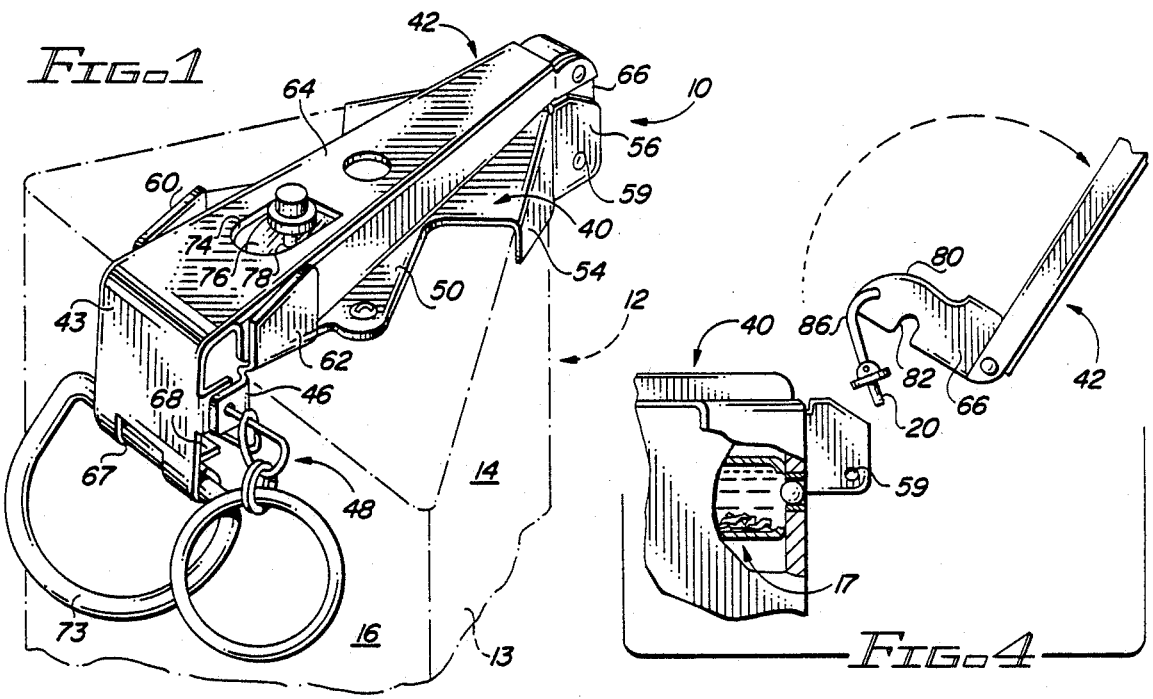
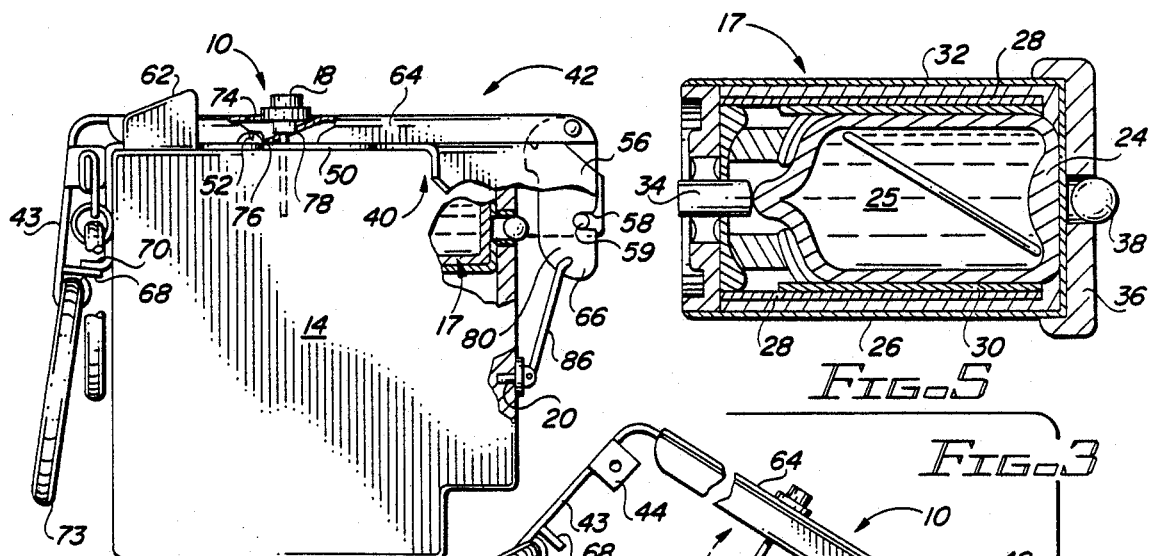
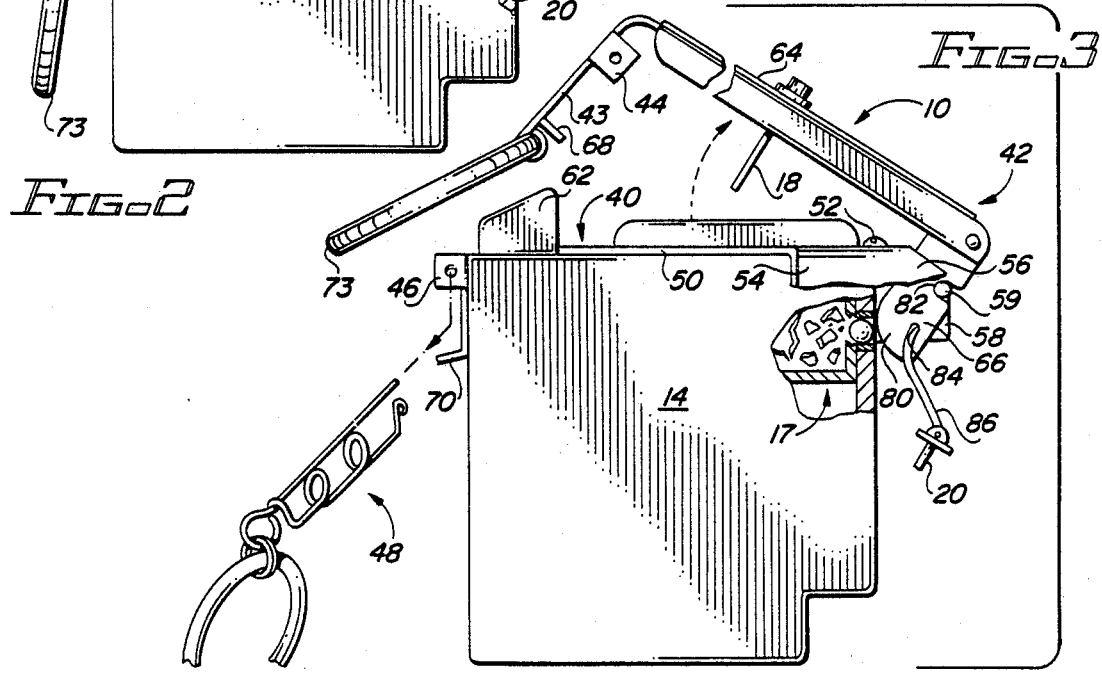

MANUAL ACTIVATOR FOR RESERVE BATTERIES

STATEMENT OF GOVERNMENT INTEREST

The Government has rights in this invention pursuant to Contract No. DAAK10-84-C-0239, awarded by the Department of the Army.

BACKGROUND OF THE INVENTION

1. Field of the Invention

This invention relates in general to battery activation devices and, more particularly, to a manual activator for mechanically fracturing the electrolyte storage ampule in a reserve battery.

2. Description of the Prior Art

Electronic munitions, fuzes, safing and arming mechanisms and other types of electrical devices having long term storage requirements are often provided with reserve batteries containing glass ampules filled with an electrolyte. Activation of this type of battery is accomplished by fracturing the ampule to release the electrolyte, which subsequently flows to the electrodes of the battery and wets them, allowing the battery to supply its rated voltage and power.

The glass ampule may be fractured either mechanically or explosively. Prior art mechanical devices, which typically include intricate spring-loaded mechanisms which operate to deform the battery directly, have generally been unsatisfactory due to the difficulty of storing enough energy in a spring within a reasonable volume. Such devices tend to activate too slowly, and often do not result in ampule fracture. Explosive devices, which utilize an electrically or mechanically detonated pyrotechnic primer to drive a structural member into the battery casing, have been somewhat more reliable than the prior art mechanical devices, but they require more complex, expensive hardware, are noisy when detonated, and require extra safety precautions during production, handling, and use.

Accordingly, a need is felt for a new and useful battery activation device which overcomes the difficulties and shortcomings of the prior art.

SUMMARY OF THE INVENTION

The present invention comprises a manual activation device in the form of a lever having a cam surface disposed for contact with a ball carried in a cap mounted at one end of a reserve battery. Activation of the battery is accomplished by rotating the lever about a pivot, causing the cam surface to drive the ball into the battery and break the ampule within. Thus, unlike the prior art mechanical activation devices, which derive the force for fracturing the ampule from stored energy supplied by a spring, the present invention relies only on positive displacement of the ball, which is a function of the dimensions of the device and of the amount of energy supplied by the operator.

The lever is preferably mounted on the pivot by means of a slotted bearing surface which allows the lever to be removed from the device only after the ampule has been broken. This provides visual indication that the battery has been activated, thus eliminating uncertainty on the part of the operator and other personnel.

Although the primary function of the activation lever is to fracture the storage ampule in a reserve battery, it can also be adapted to accomplish other functions nearly simultaneously. For instance, in the preferred embodiment of the invention, in which the lever is used to activate a reserve battery in a Pursuit Deterrent Munition (PDM), rotation of the lever also causes a safety pin to be withdrawn from the safe and arm mechanism and an electrical shorting bar to be removed from the munition via a wire link.

Accordingly, it is an object of this invention to provide a manual activator for breaking the ampule of a storage battery by means of direct camming action.

Another object of the invention is to provide a manual activator for a reserve battery with a lever which is removable from the battery only after the storage ampule in the battery has been broken.

Another object of the invention is to provide a manual activator which is designed to withstand rough handling such as is encountered during military applications.

Another object of the invention is to design a manual activator which is simple and relatively inexpensive to manufacture and use.

Still another object of the invention is to provide a manual activator for the reserve battery of a Pursuit Deterrent Munition (PDM) which performs multiple functions such as withdrawing the safety pin of the mine's safe and arm mechanism and removing the shorting bar of the fuzing system nearly simultaneously with fracturing the storage ampule in the battery.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view showing the manual activator of the present invention.

FIG. 2 is a side view, with portions broken away, of the manual activator of the present invention, in combination with a Pursuit Munitions Device (PDM).

FIG. 3 is a side view, with portions broken away, of the manual activator in a partially pivoted position.

FIG. 4 is a fragmentary side view showing the lever of the manual activator being removed from the support element.

FIG. 5 is an enlarged sectional view showing a reserve battery for use with the manual activator of the present invention.

DESCRIPTION OF THE PREFERRED EMBODIMENTS

The manual activator of the present invention, which is indicated in its entirety by the numeral 10, is shown in FIGS. 1-5, mounted on a hand deployed electronic munition 12 known as the Pursuit Deterrent Munition (PDM). The structural details of the PDM do not constitute an essential part of the present invention, since the activator 10 may be used in other types of munition devices or even in civilian devices such as emergency lights or beacon radios having reserve batteries. However, for the sake of background, it is noted that the PDM includes a generally wedge-shaped body 13 having converging side walls 14 and an end wall 16, and containing a reserve battery 17. In addition the PDM includes a safety pin 18 which prevents the conventional safe and arm mechanism (not shown) from becoming armed and a shorting bar 20 for disabling the electronic fuzing system (not shown) of the device until removed.

As shown in detail in FIG. 5, the reserve battery 17, which may be for example a Honeywell G-2666 lithium battery or ADAM ammonia battery, includes a glass ampule 24 containing an electrolyte 25, a first electrode 26, a separator 28, a second electrode 30, and a deformable casing 32. One end of the battery 17 comprises a terminal 34, and mounted to the opposite end is a cylindrical cap 36 in which a spherical metal ball 38 is mounted. The battery 17 is mounted in the body 13 in such a way that the ball 38, which can be made of steel, projects through the front portion of the body 13 and is disposed for cooperation with the activator 10 as will be described below.

The manual activator 10 comprises a support element 40 for mounting the element on top of the munition 12 or other such device, and a lever 42 pivotably secured to the support element 40. The free end of the lever 42 is formed as a handle 43 having a pair of apertured tabs 44 which, together with similar, aligned tabs 46 on the support element 40, receive the straight leg of a controlled release safety clip 48, preferably of the type disclosed in my co-pending U.S. patent application which was filed July 27, 1987 and assigned Ser. No. 07/078,331, the disclosure of which is hereby incorporated by reference. For applications other than the PDM, other means for locking the lever 42 to the support element 40 may be used in lieu of the illustrated safety clip 48.

The support element 40 of the activator 10 comprises a flat mounting plate 50 which is secured to the top surface of the munitions device 12 by means of screws 52 or other appropriate fasteners. At one end of the support element 40, a pair of converging sidewalls extend downwardly at right angles from opposite sides of the mounting plate 50, forming a nosepiece 54 which fits over the apex of the wedge shaped munition body 13. A pair of wing members 56, 58 extend longitudinally from the top of the nosepiece 54, beyond the end of the mounting plate 50 to support a transversely extending pivot pin 59. In addition, a pair of upstanding side members 60, 62 may be provided on opposite sides of the mounting plate 50, wherein the two upstanding members 60, 62 together define opposite walls of a cradle structure for retaining the lever 42 in a centered position on top of the support element 40.

The lever 42 comprises a top arm 64 which rests on the mounting plate 50 when the lever is in a stowed, or non-use, position, and a side arm 66 which extends perpendicularly downward from the end of the top arm 64 opposite the handle 43 and is retained between the wing members 56, 58 of the support element 40.

The handle 43 of the lever 42 includes a cut out porton 67 which is turned inwardly to form a lip 68 which extends transversely below the bottom edges of the apertured tabs 44 on the lever and cooperates with a catch 70 extending transversely below the apertured tabs 46 on the support element 40 to retain the lever 42 in its stowed position. A pull ring 73 is provided at the distal end of the handle 43 to facilitate manual actuation of the lever 42.

A small U-shaped slot 74 is formed in the surface of the top arm 64, and the portion of the surface which is inscribed by the slot 74 is pressed inwardly to define a tongue 76. The tongue 76 is provided with a slotted aperture 78 through which the safety pin 18 of the safe and arm mechanism projects so as to allow sliding action in the aperture 78.

The lower portion of the side arm 66 of the lever 42 is curved to define a solid, continuous cam surface 80 disposed for contact with the ball 38 in the cap 36 mounted to the reserve battery 17, while the outer face of the side arm 66 includes an outwardly opening slot 82 which serves as a bearing surface for removably mounting the lever 42 on the pivot pin 59. In addition, a small aperture 84 is formed in the lower end of the side arm 66, with a wire link 86 being threaded through this aperture 84 for connecting the lever 42 to the shorting bar 20 of the PDM.

Activation of the reserve battery 17 of the PDM is illustrated in FIGS. 3 and 4. First, the safety clip 48 must be withdrawn from the pairs of apertured tabs 44, 46, in the handle 43 and the support element 40. Then, the operator must pull outwardly on the pull ring 73 until the inturned lip 68 on the handle 43 clears the outwardly projecting catch 70 on the support element 40, and pivot the lever 42 upwardly about the pivot pin 59. The pivoting movement of the lever 42 causes the cam surface 80 to drive the ball 38 into the reserve battery 17. This causes the deformable casing 32 to indent, which in turn fractures the glass ampule 24, allowing electrolyte 25 to flow to the electrodes 26, 30 to activate the battery. At the same time, the pivoting of the lever 42 causes the safety pin 18 to be pulled out of the body 13 of the PDM, and the shorting bar 20 to be broken via the wire link 86. Once the lever 42 has been pivoted more than 90° away from its stowed position, the lever 42 can be removed from the support element as shown in FIG. 4. Removal of the lever 42 will not be possible unless the lever 42 has been pivoted to such an extent that the glass ampule 24 has been broken. Thus, absence of the lever 42 will provide a clear visible indication to all concerned personnel that the reserve battery 17 has been activated.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. A manual activator (10) for a reserve battery (17) of the type including a deformable casing (32) surrounding a fracturable ampule (24) containing an electrolyte (25), said activator (10) comprising:
   (a) a support element (40) for mounting said activator (10) in juxtaposed relation to said reserve battery (17);
   (b) a lever (42) pivotably connected to said support element (40); and
   (c) a cam surface (80) formed on said lever; and
   (d) means for cooperating with said cam surface to impart a linear mechanical force to the deformable casing of the battery, causing the casing to indent and the ampule to fracture when said lever is pivoted away from said support element.

2. The manual activator (10) of claim 1, in which said means for cooperating with said cam surface comprises:

(a) a cap for (36) mounting on the reserve battery (17); and
(b) a ball (38) mounted within said cap, with a portion of said ball (38) being disposed for contact with said cam surface (80) and another portion of said ball (38) being disposed for contact with the deformable casing (32) of the battery (17).

3. The manual activator (10) of claim 2, further comprising means for permitting removal of said lever (42) from said support element (40) only after the ampule (24) in said reserve battery (17) has been fractured.

4. The manual activator (10) of claim 3, in which said means for permitting removal of said lever (42) comprises a slotted bearing surface (82) provided in said lever (42) for retaining said lever (42) on said support element (40).

5. The manual activator (10) of claim 4, further comprising removable locking means (48) for preventing premature pivoting of said lever (42) relative to said support element.

6. The manual activator (10) of claim 5, in which said means for preventing pivoting comprises a safety clip (48) having a controlled release force.

7. The manual activator (10) of claim 4, further comprising a handle (43) including an inturned lip (68) formed at one end of said lever (42), and an outwardly extending catch (70) formed on said support element (40), said lip cooperating with said catch to retain said lever (42) in a stowed position on top of said support element (40).

8. A battery activation device (12) comprising, in combination:
(a) a reserve battery (17) mounted within said device (13), said reserve battery (17) including,
  (i) a fracturable ampule (24) containing electrolyte (25), and
  (ii) a deformable casing (32) surrounding said ampule (24);
(b) a cap (30) mounted at one end of said battery (17),
(c) a ball (38) mounted within said cap (36), with one portion of said ball (38) disposed for contact with said deformable battery casing (32) and another portion of said ball (38) projecting outside of said device (12);
(d) a manual activator (10) for fracturing said ampule (24) to release said electrolyte (25) and activate said battery (17), said activator including,
  (i) a support element (40) for mounting said activator (10) on said device (12) in juxtaposed relation to said reserve battery (17),
  (ii) a pivot pin (59) mounted on said support element (40),
  (iii) a lever (42) mounted for rotation about said pivot pin (59), and
  (iv) a cam surface (80) formed on said lever (42) for directly engaging said ball (38) in said cap (36) of said reserve battery (17) and driving said ball (38) into said battery (17) to deform said casing (32) and fracture said ampule (24) when said lever (42) is pivoted away from said support element (40).

9. The device (12) of claim 8, in which said lever (42) includes a slotted bearing surface (82) for removably mounting said lever (42) on said pivot pin (59), said slotted bearing (82) opening outwardly away from said cam (80) surface in order to permit removal of said lever (42) from said support element (40) only after said lever (42) has been pivoted sufficiently to fracture said ampule (24).

10. The device (12) of claim 8, further comprising removable locking means (48) for preventing pivoting of said lever (42) relative to said support element.

11. The device (12) of claim 10, in which said removable locking means comprises a safety clip (48) having a controlled release force.

12. The device (12) of claim 8, in which said manual activator (10) further comprises a handle (43) including an inturned lip (68) formed at one end of said lever (42), and an outwardly extending catch (70) formed on said support element (40), said lip (68) cooperating with said catch (70) to retain said lever (42) in a stowed position on top of said support element (40).

13. A battery activated munitions device (12) comprising, in combination:
(a) a munition body (13);
(b) a safing and arming mechanism;
(c) a warhead;
(d) a safety pin (18) for preventing the safing and arming mechanism from becoming armed until removed;
(e) an electronic fuzing system including a power supply;
(f) a shorting bar (20) for shorting the power supply for said electronic fuzing system;
(g) a reserve battery (17) mounted within said munition body (13) for supplying power to said device (12), said reserve battery (17) including,
  (i) a fracturable ampule (24) containing electrolyte (25), and
  (ii) a deformable casing (32) surrounding said ampule (24);
(h) a cap (36) mounted at one end of said battery (17);
(i) a spherical ball (38) mounted within said cap (36), with one portion of said ball (38) disposed for contact with said deformable casing (32) and another portion of said ball (38) projecting outside of said munition body (13); and
(j) a manual activator (10) for fracturing said ampule (24) to release said electrolyte (25) and activate said battery (17), said activator (10) including,
  (i) a support element (40) for mounting said activator (10) on said munition body (13) in juxtaposed relation to said reserve battery (17),
  (ii) a pivot pin (59) mounted on said support element (40),
  (iii) a lever (42) mounted for rotation about said pivot pin (59),
  (iv) a cam surface (80) formed on said lever (42) for directly engaging said ball (38) in said cap (36) on said reserve battery (17) and driving said ball (38) into said battery (17) to deform said casing (32) and fracture said ampule (24) when said lever (42) is pivoted away from said support element (40).

14. The munitions device (12) of claim 13, in which said lever (42) includes a slotted bearing surface (82) for removably mounting said lever (42) on said pivot pin (59), said slotted bearing surface (82) opening outwardly away from said cam surface (80) in order to permit removal of said lever (42) from said support element (40) only after said lever (42) has been pivoted sufficiently to fracture said ampule (24).

15. The munitions device (12) of claim 13, further comprising removable locking means (48) for preventing pivoting of said lever (42) relative to said support element (40).

16. The munitions device (12) of claim 15, in which said removable locking means comprises a safety clip (48) having a controlled release force.

17. The munitions device (12) of claim 13, in which said manual activator (10) further comprises a handle (43) including an inturned lip (68) formed at one end of said lever, and an outwardly extending catch (70) formed on said support elmeent (40), said lip (68) cooperating with said catch (70) to retain said lever (42) in a stowed position on top of said support element (40).

18. The munitions device (12) of claim 13, further comprising means (78) for connecting said lever (42) to said safety pin (18) to cause said safety pin (18) to be pulled out of said munitions body (13) to arm said safing and arming mechanism when said lever (42) is pivoted.

19. The munitions device (12) of claim 13, further comprising means (86) for connecting said lever (42) to said shorting bar (20) to pull said shorting bar (20) out of said munition body (13) when said lever (42) is pivoted.

* * * * *